US012762805B1

(12) United States Patent
Hobbins et al.

(10) Patent No.: US 12,762,805 B1
(45) Date of Patent: Oct. 13, 2026

(54) CONCURRENT VIEW OF REAL AND VIRTUAL ENVIRONMENTS

(71) Applicant: Apple Inc., Cupertino, CA (US)

(72) Inventors: David Hobbins, Venice, CA (US); Divine Keetle-Maloney, Santa Clara, CA (US); Steven A. Marchette, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 199 days.

(21) Appl. No.: 18/437,451

(22) Filed: Feb. 9, 2024

Related U.S. Application Data

(60) Provisional application No. 63/450,489, filed on Mar. 7, 2023.

(51) Int. Cl.

| | |
|---|---|
| ***G06T 19/00*** | (2011.01) |
| ***G06T 19/20*** | (2011.01) |
| ***G06V 10/46*** | (2022.01) |
| ***G06V 10/60*** | (2022.01) |

(52) U.S. Cl.
CPC ............ *G06T 19/006* (2013.01); *G06T 19/20* (2013.01); *G06V 10/46* (2022.01); *G06V 10/60* (2022.01); *G06T 2219/2004* (2013.01)

(58) Field of Classification Search
None
See application file for complete search history.

(56) References Cited

U.S. PATENT DOCUMENTS

| | | | | |
|---|---|---|---|---|
| 9,883,110 | B2 * | 1/2018 | Martin | G06F 3/011 |
| 11,315,056 | B2 * | 4/2022 | Almashor | G16H 40/20 |
| 2024/0259530 | A1 * | 8/2024 | Lyon | H04N 7/157 |

OTHER PUBLICATIONS

Sousa, Mauricio, Mendes, Daniel, Jorge, Joaquim, "Safe Walking in VR using Augmented Virtuality"; arXiv:1911.13032v1 [cs.HC] Nov. 29, 2019, pp. 1-10.

* cited by examiner

*Primary Examiner* — Tapas Mazumder
(74) *Attorney, Agent, or Firm* — Thompson Hine LLP

(57) ABSTRACT

Various implementations disclosed herein include devices, systems, and methods that enable concurrent viewing of both virtual and real 3D environments. This may involve presenting a virtual environment overlaying a physical environment. For example, a process may align a 3D representation of a second environment with a 3D coordinate system of a physical environment and determining a viewpoint within the 3D coordinate system based on a position of the electronic device within the physical environment. The process may further include presenting a view of the physical environment with an overlaid view of the 3D representation of the second environment based on the viewpoint. The overlaid view of the 3D environment includes visible lines defining transparent portions through which at least a portion of the view of the physical environment is visible.

24 Claims, 6 Drawing Sheets

CONCURRENT VIEW OF REAL AND VIRTUAL ENVIRONMENTS

CROSS-REFERENCE TO RELATED APPLICATIONS

This application claims the benefit of U.S. Provisional Application Ser. No. 63/450,489 filed Mar. 7, 2023, which is incorporated herein in its entirety.

TECHNICAL FIELD

The present disclosure generally relates to systems, methods, and devices that enable concurrent presentation of virtual and real three-dimensional (3D) environments.

BACKGROUND

Existing extended reality (XR) presentation techniques enable people to view a combination of virtual and real content. However, such techniques may not adequately facilitate concurrent viewing of both virtual and real 3D environments.

SUMMARY

Various implementations disclosed herein include devices, systems, and methods that enable concurrent viewing of both virtual and real 3D environments. Some implementations provide a representation of a virtual 3D environment overlaid upon a view (e.g., pass-through video or optical see-through) of a physical environment (e.g., displayed by a head mounted device (HMD) or a handheld device). The overlaid representation of the virtual 3D environment may include visible lines and transparent portions that allow portions of the physical environment to be viewed. The lines and transparent portions allow the user to concurrently view the physical environment (via the optical see-through or pass-through video) and the representation of the virtual 3D environment while distinguishing viewing features (of each environment) based on characteristics of the view of the physical environment and the representation of the virtual 3D environment.

In some implementations, objects of the virtual 3D environment may be switched (manually or automatically) between transparent views and fully-rendered views. In some implementations, visible lines and transparent portions (allowing portions of optical see-through or pass-through video to be viewed) of the virtual 3D environment comprise an appearance of surface contour lines (e.g., a white wire-frame structure) representing room features (e.g., walls, furniture, etc.). The visible lines may be straight or curved. In some implementations, the visible lines are presented with a higher contrast level than a contrast level of the pass-through video being presented. In some implementations, the visible lines are presented with a higher brightness level than a brightness level of the pass-through video being presented, e.g., using brightness levels/headroom that is reserved for non-passthrough content.

In some implementations, views of the virtual 3D environment overlaying the optical see-through or pass-through video may be transitioned between views that depict all optical see-through or pass-through video, optical see-through or passthrough video with the virtual 3D environment comprising a full surface contour line structure, optical see-through or pass-through video with a portion of the virtual 3D environment comprising a full surface contour line structure and a portion of the virtual 3D environment fully rendered, and all of the virtual 3D environment fully rendered.

In some implementations, an electronic device has a processor (e.g., one or more processors) that executes instructions stored in a non-transitory computer-readable medium to perform a method. The method performs one or more steps or processes. In some implementations, a 3D representation of a second environment is aligned with a 3D coordinate system of a physical environment. In some implementations, a viewpoint within the 3D coordinate system is determined based on a position of the electronic device within the physical environment. In some implementations, the view of the physical environment (e.g., via optical see-through or video signal presented as pass-through video) is presented with an overlaid view of the 3D representation of the second environment based on the viewpoint. In some implementations, the overlaid view of the 3D environment may include visible lines defining transparent portions through which at least a portion of the physical environment is visible (e.g., via optical see-through or pass-through video).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
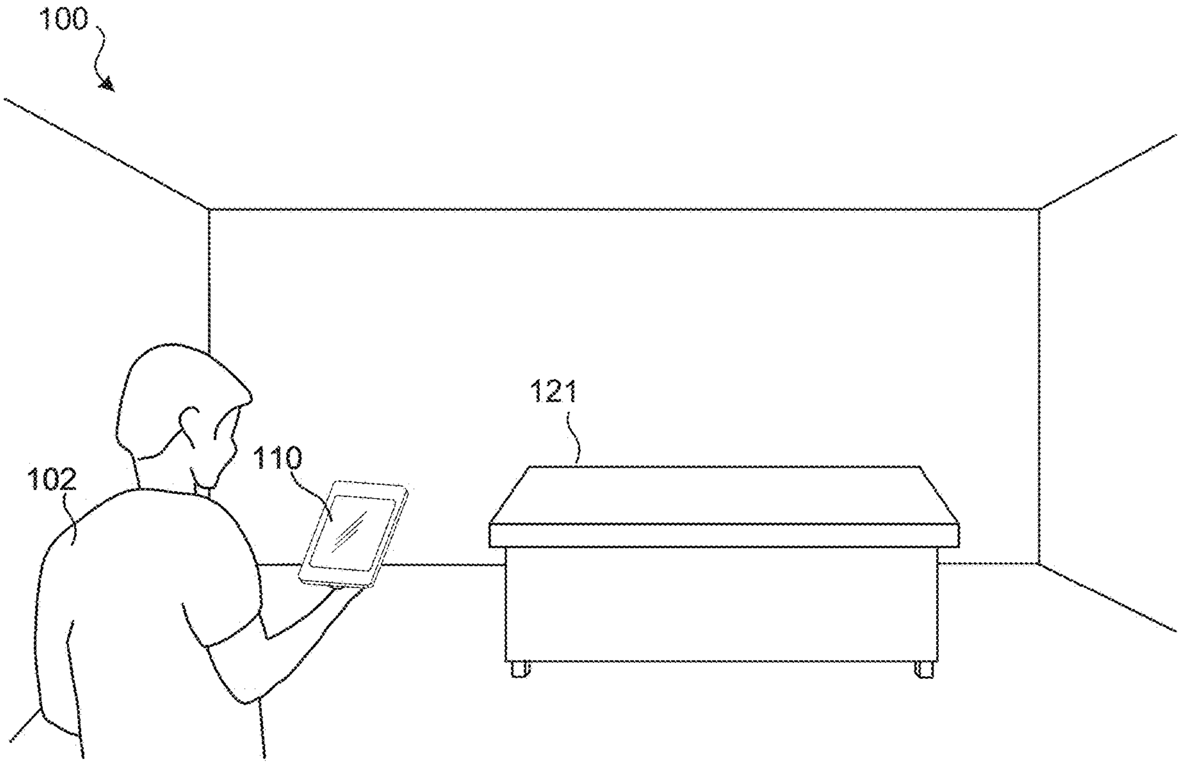
FIGS. 1A-B illustrate exemplary electronic devices operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1B:
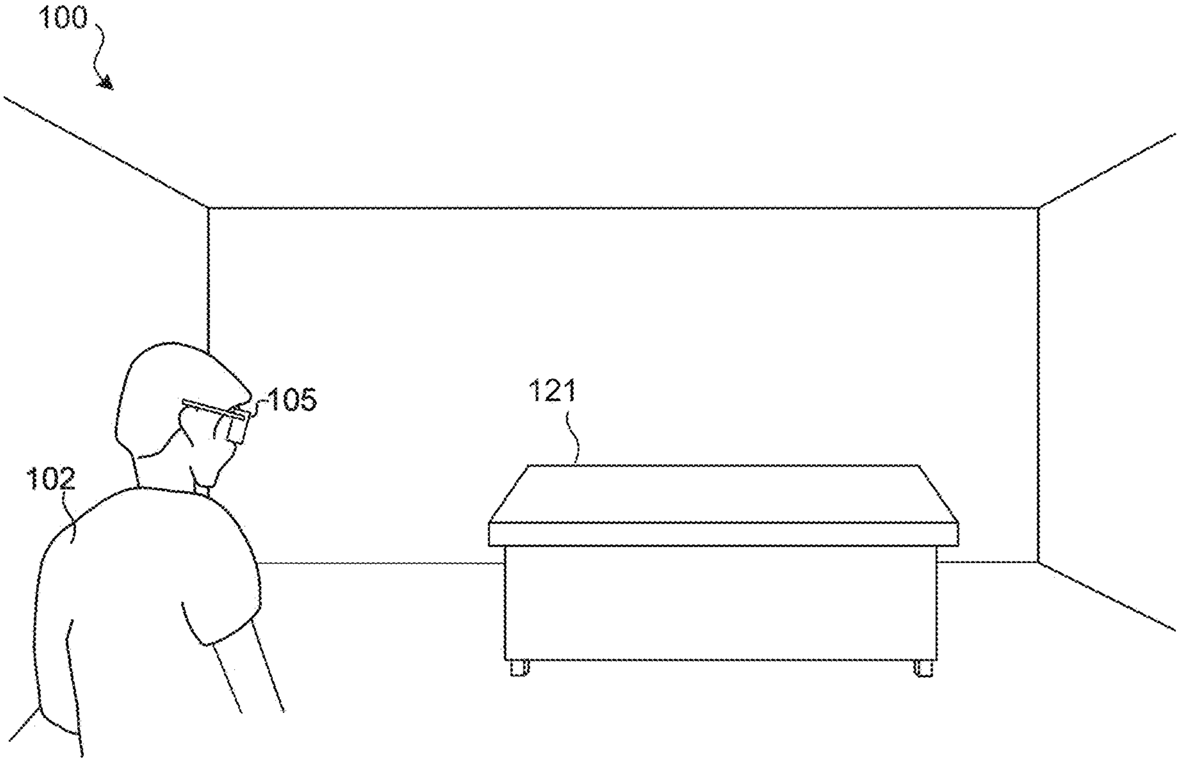

FIGS. 1A-B illustrate exemplary electronic devices 105 and 110 operating in a physical environment 100. In the example of FIGS. 1A-B, the physical environment 100 is a room that includes a desk 121. The electronic devices 105 and 110 may include one or more cameras, microphones, depth sensors, or other sensors that can be used to capture information about and evaluate the physical environment 100 and the objects within it, as well as information about the user 102 of electronic devices 105 and 110. The information about the physical environment 100 and/or user 102 may be used to provide visual and audio content and/or to identify the current location of the physical environment 100 and/or the location of the user within the physical environment 100.

In some implementations, views of an extended reality (XR) environment may be provided to one or more participants (e.g., user 102 and/or other participants not shown) via electronic devices 105 (e.g., a wearable device such as an HMD) and/or 110 (e.g., a handheld device such as a mobile device, a tablet computing device, a laptop computer, etc.). Such an XR environment may include views of a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system associated with the XR environment, which may correspond to a 3D coordinate system of the physical environment 100.

In some implementations, video (e.g., pass-through video depicting a physical environment) is received from an image sensor of a device (e.g., device 105 or device 110). In some implementations, a 3D representation of a virtual environment is aligned with a 3D coordinate system of the physical environment. A sizing of the 3D representation of the virtual environment may be generated based on, inter alia, a scale of the physical environment or a positioning of an open space, floor, wall, etc. such that the 3D representation is configured to align with corresponding features of the physical environment. In some implementations, a viewpoint within the 3D coordinate system may be determined based on a position of the electronic device within the physical environment. The viewpoint may be determined based on, inter alia, motion sensor data, image data (e.g., retrieved via a virtual inertial odometry system (VIO), a simultaneous localization and mapping (SLAM) system, etc.).

In some implementations, the 3D representation of the virtual environment comprises a structural rendering (e.g., of a structure such as a museum, a stadium, a vehicle, etc.) that includes visible lines defining transparent areas for allowing portions of a view (e.g., optical see-through or video pass-through) of a physical environment (e.g., an interior of a user apartment including different rooms) to be visible when a view the 3D representation is transposed over the view thereby allowing a user to concurrently view/move through the virtual environment while still viewing and moving through the physical environment.

Figure 2A:
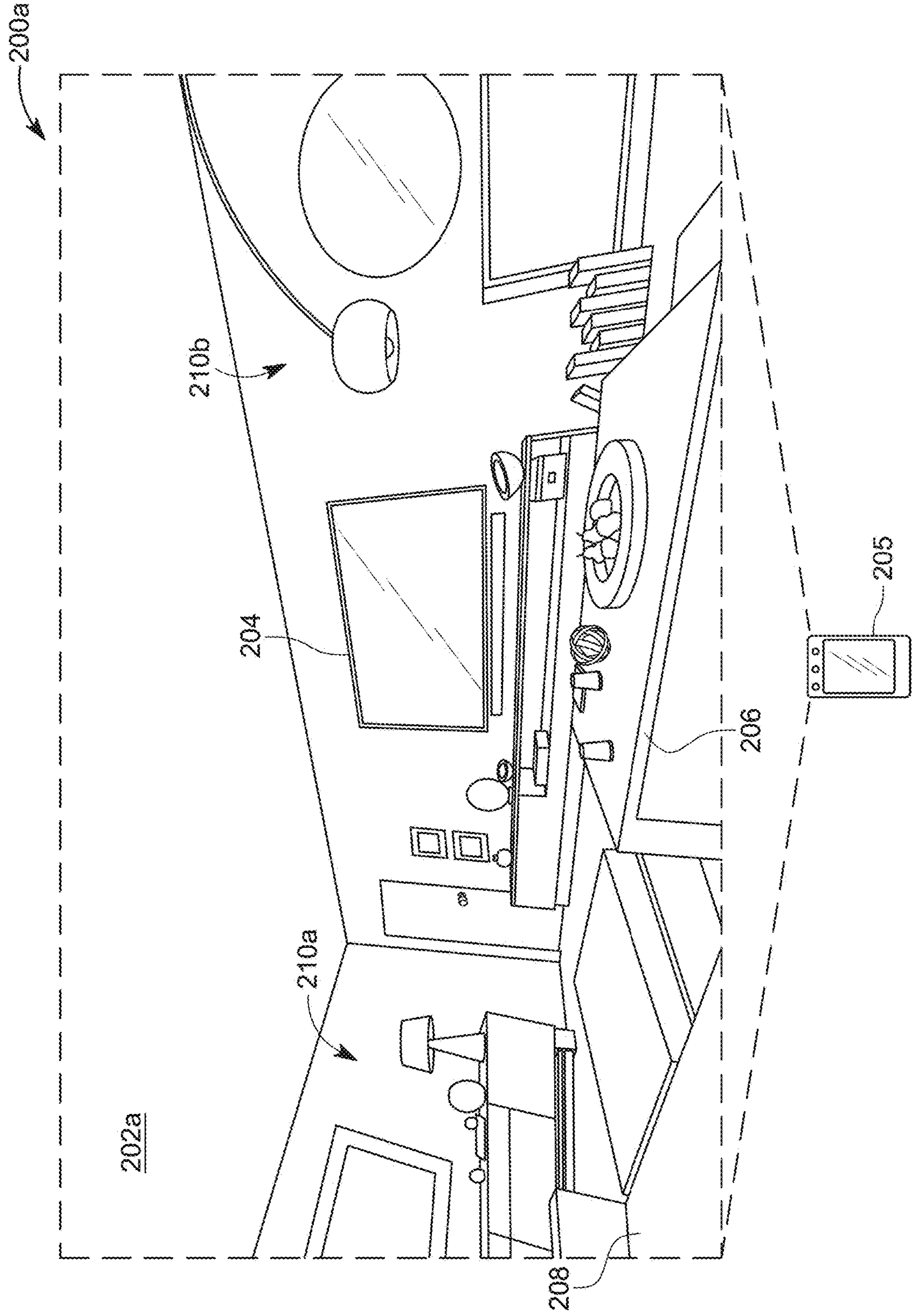
FIGS. 2A-2C illustrate views of an XR environment provided by the devices of FIG. 1, in accordance with some implementations.

FIG. 2A illustrates a view 202*a* of a pass-through video signal 200*a* of a physical environment (e.g., physical environment 100 of FIG. 1) provided by a device 205 (e.g., device 105 and/or 110 of FIG. 1), in accordance with some implementations. Pass-through video signal 200*a* includes a depiction 204 of a television, a depiction 206 of a table, a depiction 208 of a couch, and depictions 210*a* and 210*b* of accessories (e.g., pictures, lighting, etc.). Depictions 204, 206, 208, 210*a* and 210*b* comprise representations of a physical objects that may be viewed as pass-through video (as illustrated in FIG. 2A) or may be a direct optical see-through view of physical objects through a transparent or translucent display.

Figure 2B:
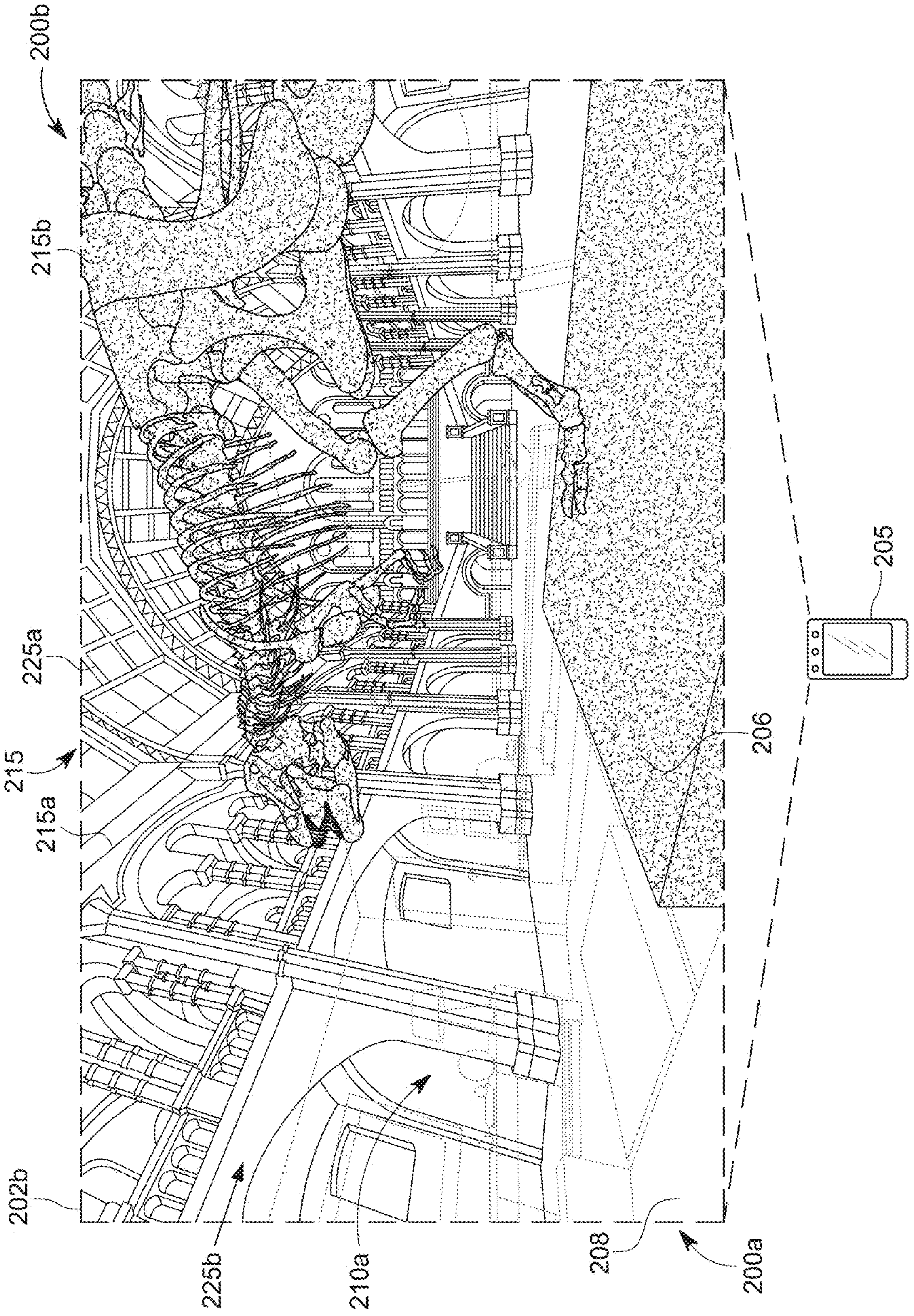

FIG. 2B illustrates a view 202*b* of an extended reality (XR) environment 200*b* provided by device 205 (the device 105 and/or 110 of FIG. 1), in accordance with some implementations. XR environment 200*b* includes pass-through video 200*a* (as illustrated in FIG. 2A) of a physical environment (such as e.g., an apartment currently occupied by a user) and a virtual representation 215 of a virtual environment selected by a user for viewing. In some implementations, virtual representation 215 includes a virtual portion 215*a* and a virtual portion 215*b*. Virtual portion 215*a* of the virtual representation 215 comprises visible lines and transparent portions (e.g., a surface contour line structure depicting structural elements (e.g., walls, furniture, floor, ceiling, windows, etc.) of a building such as, e.g., a museum). Virtual portion 215*b* of the virtual representation 215 comprises a fully rendered structure of an object (e.g., a dinosaur).

In some implementations, virtual representation 215 is displayed over pass-through video signal 200*a* of a physical environment (e.g., displayed by a head mounted device (HMD) or a handheld device) such that the visible lines (of virtual portion 215*a*) are presented over the pass-through video 200*a* and the transparent portions (of portion 215*a*) allow portions of the pass-through video signal 200*a* (of the physical environment) to be viewed by a user. The visible lines and transparent portions projected with respect to pass-through video 200*a* allow the user to concurrently view the physical environment (via the pass-through video signal 200*a*) and virtual portion 215*a* of the virtual representation 215 while and distinguishing viewing features (of each environment) based on characteristics of the pass-through video signal 200*a* (of the physical environment) and virtual portion 215*a* of the virtual representation 215. Enabling the user to concurrently view a physical environment and a virtual environment allows the user to view and understand a scale of the virtual environment (i.e., without completely blocking the user's view of the physical environment) while enabling the user to be aware of the physical environment such that the user is able to avoid obstacles (e.g., furniture, walls, counters, stairs, etc.) as they move through the physical environment thereby immersing the user in the virtual environment and improving an overall viewing experience.

In some implementations, virtual representation 215 is projected over pass-through video signal 200*a* such that virtual portion 215*b* of the virtual representation 215 comprises a fully rendered structure of an object (e.g., a dinosaur) for viewing by a user via a device. The fully rendered structure may be projected using a full palate of colors representing a realistic view of an object represented by virtual portion 215*b*. For example, virtual portion 215*b* (in FIG. 2B) represents a realistic view of a dinosaur in a museum (represented by virtual portion 215*a*) thereby allowing a user to concurrently view the pass-through video 200*a* (of a physical environment such as an apartment of the user), virtual portion 215*a* (e.g., a museum), and virtual portion 215*b* (dinosaur) as if the user was actually visiting a museum and viewing a dinosaur exhibit.

In some implementations, virtual portion 215*a* and virtual portion 215*b* of the virtual representation 215 may be switched between surface contour line structural views (comprising visible lines and transparent portions as illustrated by virtual portion 215*a*) and fully rendered views (as illustrated by virtual portion 215*b*). In some implementations, virtual portion 215*a* and virtual portion 215*b* of the virtual representation 215 may be switched (between surface contour line structural views and fully rendered views) manually in response to a command from a user. In some implementations, virtual portion 215*a* and virtual portion 215*b* of the virtual representation 215 may be switched (between surface contour line structural views and fully rendered views) automatically in response to detection of user activity with respect to a physical environment. Detected user activity triggering automated triggering between views may include user movement, user proximity to an obstacle, etc.

Visible lines of virtual portion 215*a* (e.g., a surface contour line structure) may be straight lines or curved lines and may have constant or variable thickness, color, etc. For example, a thickness of the visible lines of virtual portion 215*a* may be varied as a depth cue such that the visible lines become thinner as they recede into the distance. Likewise, a color or combination of a line thickness and a color of visible lines of virtual portion 215*a* may be varied such that e.g., warmer colors (e.g., red, yellow, orange, etc.) may represent closer (to a view of the user) lines or objects and cooler colors (e.g., green, blue, purple, etc.) may represent lines or objects farther away from a view of the user. In some implementations, visible lines of virtual portion 215*a* (e.g., a surface contour line structure) include a combination of straight lines and curved lines. Such lines may correspond to edges, perimeters, boundaries, or other features of surfaces and objects of an environment.

In some implementations, visible lines of virtual portion 215*a* are presented (to the user via a device) with a higher or lower contrast level than a contrast level of pass-through video signal 200*a* being presented. In some implementations, the visible lines are presented with a higher or lower brightness level than a brightness level of the pass-through video signal 200*a* being presented, e.g., using brightness levels/headroom that is reserved for non-passthrough video content. In some implementations, passthrough video is dimmed (e.g., reducing brightness) in circumstances in which the visible lines of virtual portion 215*a* are displayed or about to be displayed to reserve brightness values/headroom for the visible lines of the virtual portion 215*a*.

In some implementations, the visible lines are presented using a single color (e.g., white or black). In some implementations, the visible lines are presented using multiple differing colors. In some implementations the visible lines are presented using one or more colors that are different than any color presented in the passthrough video content.

In some implementations, a characteristic (e.g., tint level, contrast, brightness, etc.) of pass-through video signal 200*a* may be reduced or increased to define the attributes of objects (e.g., represented by depictions 204, 206, 208, 210*a* and 210*b* of FIG. 2A) of pass-through video signal 200*a* with respect to objects or structures (e.g., virtual portions 215*a* and 215*b*) of virtual representation 215. In some implementations, a brightness level of pass-through video signal 200*a* may be reduced or increased to define the attributes of objects (e.g., represented by depictions 204, 206, 208, 210*a* and 210*b* of FIG. 2A) pass-through video signal 200*a* with respect to objects (e.g., virtual portions 215*a* and 215*b*) of virtual representation 215. In some implementations, coloring of pass-through video signal 200*a* may be modified (e.g., changed to a different color) to define the attributes of objects (e.g., represented by depictions 204, 206, 208, 210*a* and 210*b* of FIG. 2A) pass-through video signal 200*a* with respect to objects (e.g., virtual portions 215*a* and 215*b*) of virtual representation 215.

In some implementations, view 202*b* of XR environment 200*b* may be transitioned to a view that depicts all of pass-through video signal 200*a* thereby removing virtual representation 215 from a view of the user. In some implementations view 202*b* of XR environment 200*b* may be transitioned to a view that depicts passthrough video signal 200*a* with virtual representation 215 (e.g., both of virtual portions 215*a* and 215*b*) comprising a full surface contour line structure. In some implementations view 202*b* of XR environment 200*b* may be transitioned to a view that depicts passthrough video signal 200*a* with a first virtual portion of virtual representation 215 (e.g., virtual portion 215*a*) comprising a full surface contour line structure and a second virtual portion of virtual representation 215 (e.g., virtual portion 215*b*) fully rendered (e.g., as illustrated in FIG. 2B). In some implementations view 202*b* of XR environment 200*b* may be transitioned to a view that depicts all of virtual representation 215 (e.g., virtual portions 215*a* and 215*b*) fully rendered thereby removing a view of passthrough video signal 200*a*.

In some implementations, virtual portion 215*a* and/or virtual portion 215*b* may comprise a view that is partially a surface contour line structural view and partially a rendered view. For example, an upper structure portion 225*a* of virtual portion 215*a* (e.g., a ceiling) may be presented with a fully rendered view and a lower structure portion 225*b* (e.g., walls) may be presented with a surface contour line structural view. Presenting a virtual representation view that includes a partial surface contour line structural view and a partial rendered view allows a user to view portions of the physical environment that the user may be more or less likely to interact with. For example, the user may be more likely to interact with objects that are low to the ground or objects that the user may want to activate or access such as, a TV, a refrigerator, a desk, etc. Likewise, for example, the user may be less likely to interact with objects that are out of reach of the user such as a ceiling, a picture on the wall, a window, etc. In some implementations, a rendered view may be slowly transitioned to a surface contour line view such that the rendered view is slowly decreased (e.g., with respect to colors, shading, brightness, etc.) and the surface contour line view is slowly increased. Likewise, in some implementations, a surface contour line view may be slowly transitioned to a rendered view such that the surface contour line view is slowly decreased (e.g., with respect to colors, shading, brightness, etc.) and the rendered view is slowly increased.

In some implementations, a user may interact with virtual representation 215. For example, the user may navigate through and view different parts of virtual portion 215*a* by directionally moving through a physical environment. Likewise, the user may interact with virtual portion 215*b* by toggling between surface contour line and fully rendered views of virtual portion 215*b*. In some implementations, the user may disconnect and remove a virtual object (e.g., virtual portion 215*b*) from a first location (e.g., on representation 206 of a table) within virtual representation 215 and place the virtual object at a second location (within virtual representation 215) differing from the first location. The user may move a virtual object between locations (within a virtual representation) to account for potential obstacles, provide a more desirable viewing location, etc.

Figure 2C:
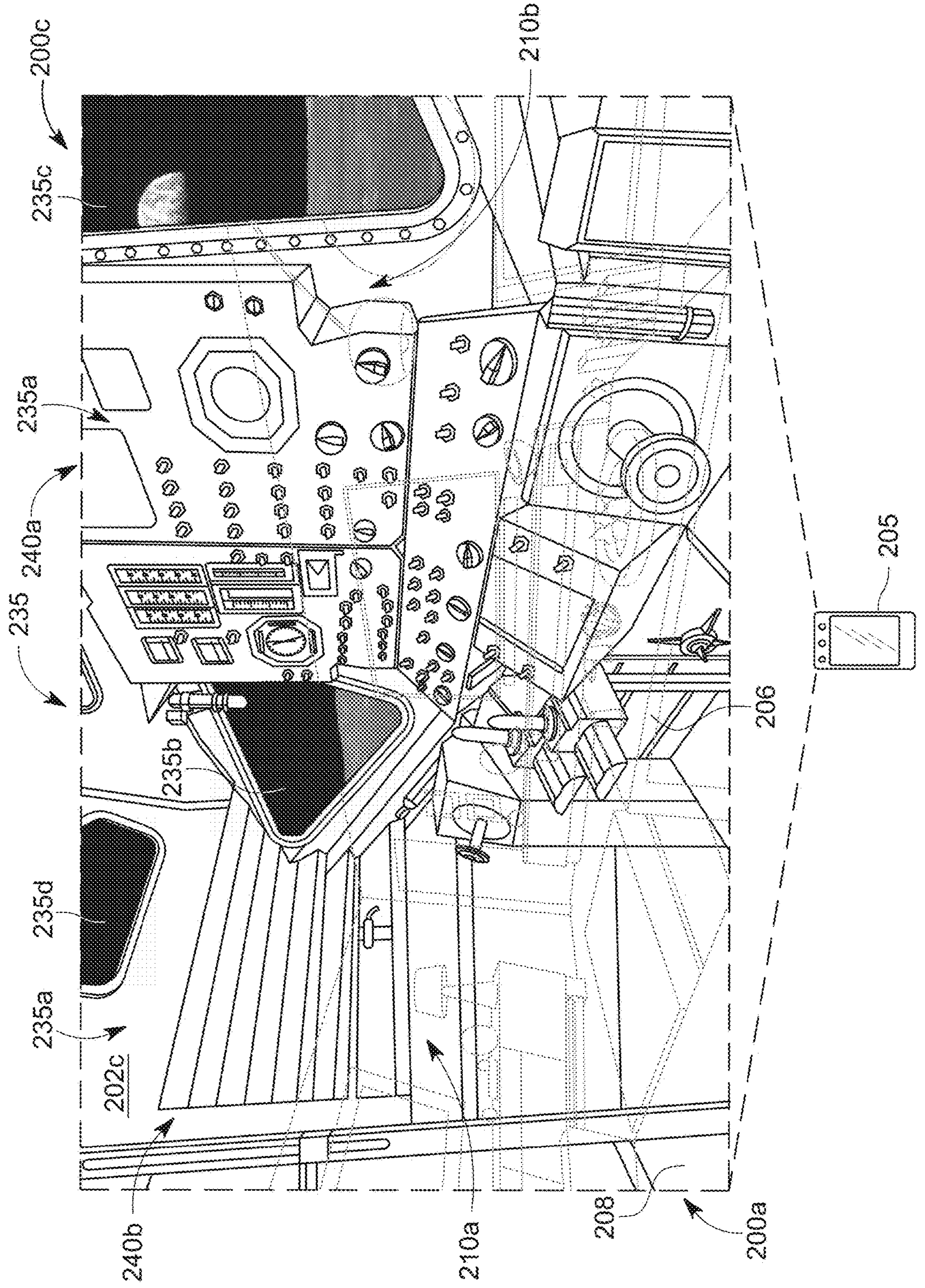

FIG. 2C illustrates a view 202*c* of an extended reality (XR) environment 200*c* provided by the device 105 and/or 110 of FIG. 1, in accordance with some implementations. XR environment 200*c* includes pass-through video 200*a* (as illustrated in FIG. 2A) of a physical environment (such as e.g., an apartment currently occupied by a user) and a virtual representation 235 of a virtual environment selected by a user for viewing. In some implementations, virtual representation 235 includes a virtual portion 235*a* and virtual portions 235*b*, 235*c*, and 235*d*. Virtual portion 235*a* of the virtual representation 235 comprises visible lines and transparent portions (e.g., a white surface contour line structure depicting structural elements of a cockpit of a vehicle such as, e.g., an airplane or a spaceship). Virtual portions 235*b*, 235*c*, and 235*d* of the virtual representation 235 comprises fully rendered structures of objects (e.g., windows).

In some implementations, virtual representation 235 is displayed over pass-through video signal 200*a* of a physical environment (e.g., displayed by a head mounted device (HMD) or a handheld device) such that the visible lines (of virtual portion 235*a*) are presented over the pass-through video 200*a* and the transparent portions (of portion 235*a*) allow portions of the pass-through video signal 200*a* (of the physical environment) to be viewed by a user. The visible lines and transparent portions projected with respect to pass-through video 200*a* allow the user to concurrently view the physical environment (via the pass-through video signal 200*a*) and virtual portion 235*a* of the virtual representation 235 while and distinguishing viewing features (of each environment) based on characteristics of the pass-through video signal 200*a* (of the physical environment) and virtual portion 235*a* of the virtual representation 235.

In some implementations, virtual representation 235 is projected over pass-through video signal 200*a* (concurrently with virtual portion 235*a*) such that virtual portions 235*b*, 235*c*, and 235*d* of the virtual representation 235 comprise fully rendered structures of objects (e.g., windows) for viewing by a user via a device. The fully rendered structures may be projected using real-world views representing a realistic view of an objects represented by virtual portions 235*b*, 235*c*, and 235*d*. For example, virtual portions 235*b*, 235*c*, and 235*d* (in FIG. 2C) represent a realistic view of windows (of a spaceship) presenting exterior views of space (e.g., a planet, black sky, a surface of a planet, etc.) thereby allowing a user to concurrently view the pass-through video 200*a* (of a physical environment such as an apartment of the user), virtual portion 235*a* (e.g., a cockpit of a spaceship), and virtual portions 235*b*, 235*c*, and 235*d* (windows) thereby allowing the user to simulate a process for piloting a spaceship (e.g., using various navigation controls and gauges) while simulating a view (outside the spaceship) through windows as if the user was actually navigating through space.

In some implementations, virtual portions 235*a*, 235*b*, 235*c*, and 235*d* of the virtual representation 235 may be switched between surface contour line structural views (comprising visible lines and transparent portions as illustrated by virtual portion 235*a*) and fully rendered views (as illustrated by virtual portions 235*b*, 235*c*, and 235*d*). In some implementations, virtual portions 235*a*, 235*b*, 235*c*, and 235*d* of the virtual representation 235 may be switched (between surface contour line structural views and fully rendered views) manually in response to a command from a user. In some implementations, virtual portions 235*a*, 235*b*, 235*c*, and 235*d* of the virtual representation 235 may be switched (between surface contour line structural views and fully rendered views) automatically in response to detection of user activity with respect to a physical environment. Detected user activity triggering automated triggering between views may include user movement, user proximity to an obstacle, etc.

In some implementations, visible lines of virtual portion 235*a* (e.g., a surface contour line structure) are straight lines. In some implementations, visible lines of virtual portion 235*a* (e.g., a surface contour line structure) are curved lines. In some implementations, visible lines of virtual portion 235*a* (e.g., a surface contour line structure) include a combination of straight lines and curved lines. In some implementations, visible lines of virtual portion 235*a* are presented (to the user via a device) with a higher or lower contrast level than a contrast level of pass-through video signal 200*a* being presented. In some implementations, the visible lines are presented with a higher or lower brightness level than a brightness level of the pass-through video signal 200*a* being presented. In some implementations, the visible lines are presented using a single color (e.g., white as illustrated in FIG. 2C). In some implementations, the visible lines are presented using multiple differing colors.

In some implementations, a tint level of pass-through video signal 200*a* may be reduced or increased to define the attributes of objects (e.g., represented by depictions 204, 206, 208, 210*a* and 210*b* of FIG. 2A) pass-through video signal 200*a* with respect to objects or structures (e.g., virtual portions 235*a*, 235*b*, 235*c*, and 235*d*) of virtual representation 235. In some implementations, a brightness level of pass-through video signal 200*a* may be reduced or increased to define the attributes of objects (e.g., represented by depictions 204, 206, 208, 210*a* and 210*b* of FIG. 2A) pass-through video signal 200*a* with respect to objects (e.g., virtual portions 235*a*, 235*b*, 235*c*, and 235*d*) of virtual representation 235. In some implementations, coloring of pass-through video signal 200*a* may be modified (e.g., changed to a different color) to define the attributes of objects (e.g., represented by depictions 204, 206, 208, 210*a* and 210*b* of FIG. 2A) pass-through video signal 200*a* with respect to objects (e.g., virtual portions 235*a*, 235*b*, 235*c*, and 235*d*) of virtual representation 235.

In some implementations, view 202*c* of XR environment 200*c* may be transitioned to a view that depicts all of pass-through video signal 200*a* thereby removing virtual representation 235 from a view of the user. In some implementations view 202*c* of XR environment 200*c* may be transitioned to a view that depicts passthrough video signal 200*a* with virtual representation 235 (e.g., all of virtual portions 235*a*, 235*b*, 235*c*, and 235*d*) comprising a full surface contour line structure. In some implementations view 202*c* of XR environment 200*c* may be transitioned to a view that depicts passthrough video signal 200*a* with a first virtual portion of virtual representation 235 (e.g., virtual portion 235*a*) comprising a full surface contour line structure and additional virtual portions of virtual representation 235 (e.g., virtual portions 235*b*, 235*c*, and 235*d*) fully rendered (e.g., as illustrated in FIG. 2C). In some implementations view 202*c* of XR environment 200*c* may be transitioned to a view that depicts all of virtual representation 235 (e.g., virtual portions 235*a*, 235*b*, 235*c*, and 235*d*) fully rendered thereby removing a view of passthrough video signal 200*a*.

In some implementations, virtual portions 235*a*, 235*b*, 235*c*, and/or 235*d* may comprise a view that is partially a surface contour line structural view and partially a rendered view. For example, a center portion structure 240*a* (e.g., a control panel) of virtual portion 235*a* may be presented with a fully rendered view and a side portion structure 240*b* (e.g., interior walls of a spaceship) may be presented with a surface contour line structural view. In some implementations, a rendered view may be slowly transitioned to a surface contour line view such that the rendered view is slowly decreased (e.g., with respect to colors, shading, brightness, etc.) and the surface contour line view is slowly increased. Likewise, in some implementations, a surface contour line view may be slowly transitioned to a rendered view such that the surface contour line view is slowly decreased (e.g., with respect to colors, shading, brightness, etc.) and the rendered view is slowly increased.

In some implementations, a user may interact with virtual representation 235. For example, the user may operate various components (e.g., switches, joystick, steering apparatus, etc.) associated with different parts of virtual portion 235*a*. In response, virtual representation 235 may simulate directional movement through an environment such as, e.g., space. Likewise, the user may interact with virtual portions 235*a*, 235*b*, 235*c* and/or 235*d* by toggling between surface contour line and fully rendered views of virtual portions 235*a*, 235*b*, 235*c*, and/or 235*d*. In some implementations, the user may disconnect and remove a virtual object (e.g., virtual portion 235*b*, 235*c*, and/or 235*d*) from a first location (e.g., to a right or left position with respect to a control panel) within virtual representation 235 and place the virtual object at a second location (within virtual representation 235) differing from the first location (e.g., within a center position within virtual representation 235 thereby giving the user a front exterior view from a spaceship). The user may move a virtual object between locations (within a virtual representation) to provide a more desirable viewing location, etc.

Figure 3:
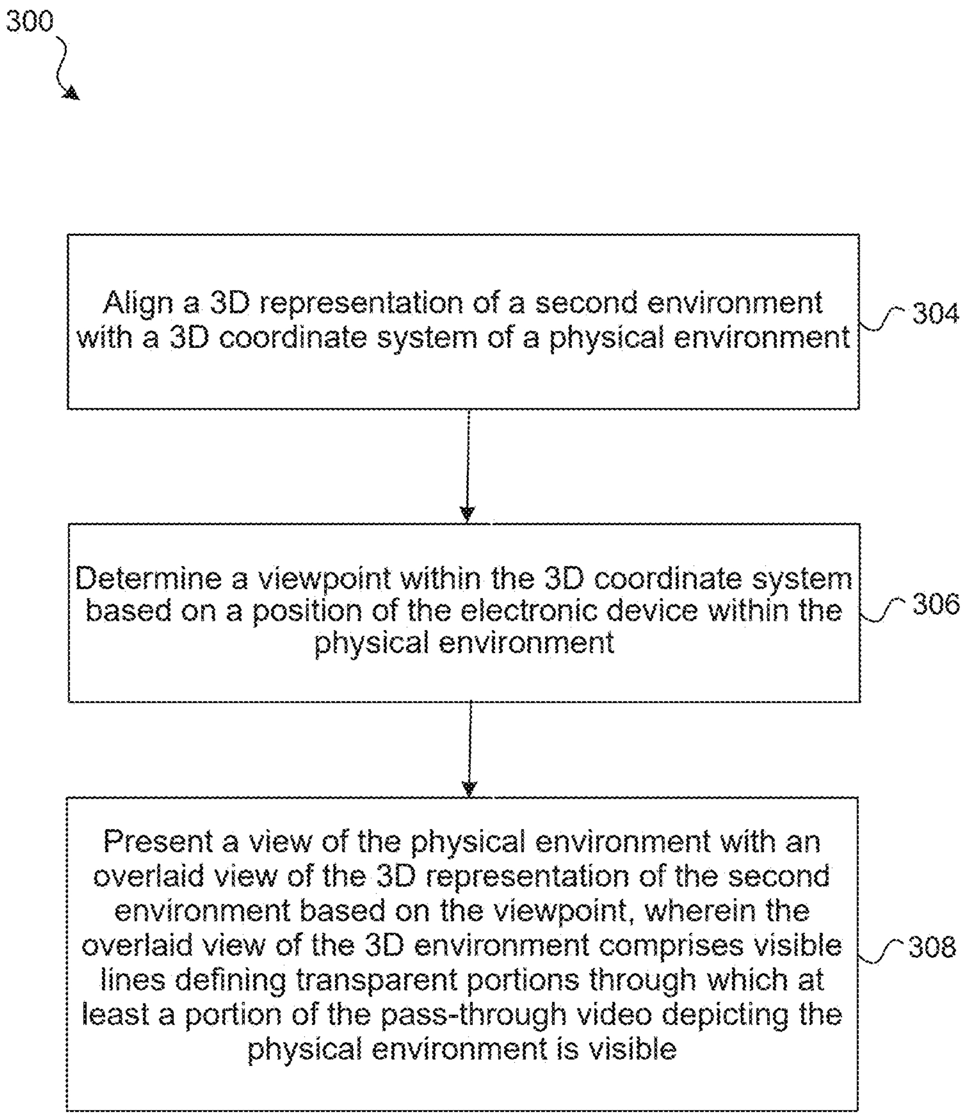
FIG. 3 is a flowchart illustrating an exemplary method that enables presentation of a representation of a virtual three-dimensional (3D) environment overlaying a view of a physical environment, in accordance with some implementations.

FIG. 3 is a flowchart representation of an exemplary method 300 that enables presentation of a representation of a virtual three-dimensional (3D) environment overlaying a view (e.g., optical see-through or pass-through video) of a physical environment, in accordance with some implementations. In some implementations, the method 300 is performed by a device, such as a mobile device, desktop, laptop, HMD, or server device. In some implementations, the device has a screen for displaying images and/or a screen for viewing stereoscopic images such as a head-mounted display (HMD such as e.g., device 105 of FIG. 1). In some implementations, the method 300 is performed by processing logic, including hardware, firmware, software, or a combination thereof. In some implementations, the method 300 is performed by a processor executing code stored in a non-transitory computer-readable medium (e.g., a memory). Each of the blocks in the method 300 may be enabled and executed in any order.

At block 304, a 3D representation of a second environment is aligned with a 3D coordinate system of a physical environment. For example, an alignment may include a process for sizing the 3D representation based on a scale of the physical environment, positioning an open space, floor, wall, etc. of the 3D representation of the second environment to align with a corresponding feature of the physical environment. In some implementations, a selection may be received (from a user) for viewing the 3D representation (e.g., a museum) of the second environment with respect to the physical environment currently occupied by the user. (e.g., an apartment, etc.).

At block 306, a viewpoint within the 3D coordinate system is determined based on a position of the electronic device within the physical environment. The position may be determined based on, inter alia, motion sensor data, image data (e.g., VIO, SLAM, etc.), additional localization techniques, etc.

At block 308, a view of the physical environment (e.g., via optical see-through or pass-through video) is presented with an overlaid view of the 3D representation of the second environment based on the determined viewpoint. The overlaid view of the 3D environment may include visible lines (e.g., straight or curved) defining transparent portions through which at least a portion of the view of the physical environment is visible. In some implementations, a video signal may be obtained from an image sensor of an electronic device (e.g., a wearable electronic device such as an HMD). The video signal may include video (e.g., optical see-through or pass-through video) depicting the physical environment. In some implementations, the video signal may include video for each eye of a user.

In some implementations, the visible lines correspond to an architectural structure. (e.g., walls, ceiling, floor, etc.). In some implementations, the overlaid view of the 3D environment comprises a white surface contour line type representation. In some implementations, the visible lines are presented using a single color. In some implementations, the visible lines are presented with a higher contrast level than a contrast level of the pass-through video being presented. In some implementations, the visible lines are presented with a higher brightness level than a brightness level of the pass-through video being presented. In some implementations, a tint level of the passthrough video being presented may be reduced or increased. In some implementations, a brightness level of the passthrough video being presented may be reduced or increased.

In some implementations, user interactions with the 3D representation of the second environment may be enabled. For example, user interactions may include, inter alia, allowing a user to simulate operations or functions (e.g., activating virtual switches or controls) associated with virtual functions of the 3D representation. In some implementations, a virtual object (of the 3D representation) may be removed from a first location within the 3D representation and placed at a second location (differing from the first location) within the 3D representation of the second environment.

In some implementations, the 3D representation of the second environment is a user interface. In some implementations, the overlaid view of the 3D environment includes a first portion comprising a white surface contour line type representation and a second portion comprising a full virtual rendering of the 3D environment.

In some implementations, a user may toggle through a view of the optical see-through or pass-through video signal with the overlaid view of the 3D representation between views including: a view comprising all of the optical see-through or pass-through video; a view comprising all of the optical see-through or pass-through video in combination with the overlaid view of the 3D environment comprising a white surface contour line type representation; a view comprising all of the optical see-through or pass-through video in combination with the overlaid view of the 3D environment a first portion comprising a white surface contour line type representation and a second portion comprising a full virtual rendering of the 3D environment; and a view comprising a view consisting of a full virtual rendering of the 3D environment. In some implementations, toggling through the views may include a manual toggling process initiated in response to input from a user of the electronic device. In some implementations, toggling through the views may include an automated toggling process initiated in response detection of user activity with respect to the physical environment. (e.g., detection of user movement, user proximity to an obstacle, etc.).

Figure 4:
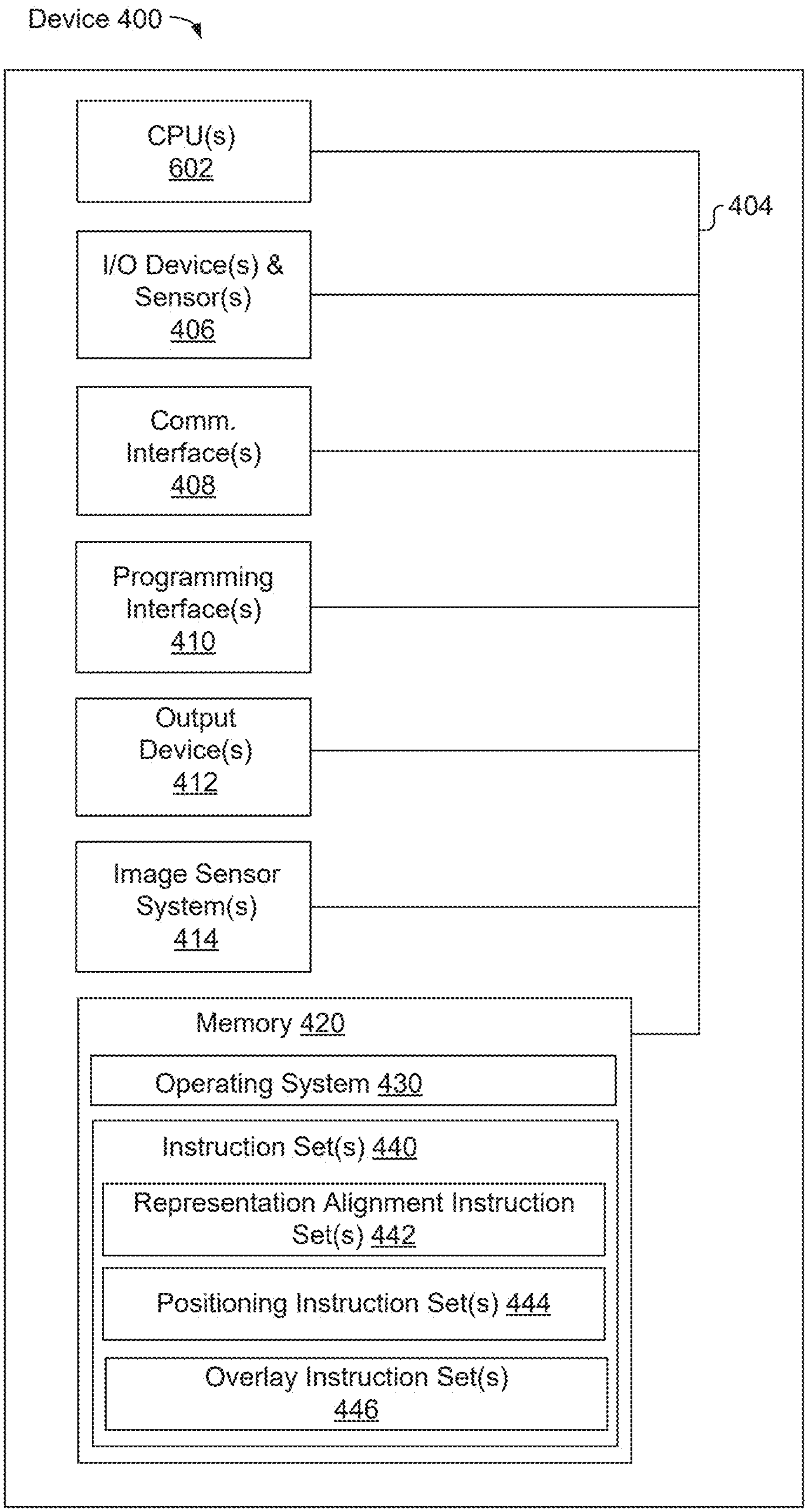
FIG. 4 is a block diagram of an electronic device of in accordance with some implementations.

FIG. 4 is a block diagram of an example device 400. Device 400 illustrates an exemplary device configuration for electronic devices 105 and 110 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units 402 (e.g., microprocessors, ASICs, FPGAs, GPUs, CPUs, processing cores, and/or the like), one or more input/output (I/O) devices and sensors 404, one or more communication interfaces 408 (e.g., USB, FIREWIRE, THUNDERBOLT, IEEE 802.3x, IEEE 802.11x, IEEE 802.14x, GSM, CDMA, TDMA, GPS, IR, BLUETOOTH, ZIGBEE, SPI, I2C, and/or the like type interface), one or more programming (e.g., I/O) interfaces 410, output devices (e.g., one or more displays) 412, one or more interior and/or exterior facing image sensor systems 414, a memory 420, and one or more communication buses 404 for interconnecting these and various other components.

In some implementations, the one or more communication buses 404 include circuitry that interconnects and controls communications between system components. In some implementations, the one or more I/O devices and sensors 406 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), one or more cameras (e.g., inward facing cameras and outward facing cameras of an HMD), one or more infrared sensors, one or more heat map sensors, and/or the like.

In some implementations, the one or more displays 412 are configured to present a view of a physical environment, a graphical environment, an extended reality environment, etc. to the user. In some implementations, the one or more displays 412 are configured to present content (determined based on a determined user/object location of the user within the physical environment) to the user. In some implementations, the one or more displays 412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 412 correspond to diffractive, reflective, polarized, holographic, etc. waveguide displays. In one example, the device 400 includes a single display. In another example, the device 400 includes a display for each eye of the user.

In some implementations, the one or more image sensor systems 414 are configured to obtain image data that corresponds to at least a portion of the physical environment 100. For example, the one or more image sensor systems 414 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 414 further include illumination sources that emit light, such as a flash. In various implementations, the one or more image sensor systems 414 further include an on-camera image signal processor (ISP) configured to execute a plurality of processing operations on the image data.

In some implementations, sensor data may be obtained by device(s) (e.g., devices 105 and 110 of FIG. 1) during a scan of a room of a physical environment. The sensor data may include a 3D point cloud and a sequence of 2D images corresponding to captured views of the room during the scan of the room. In some implementations, the sensor data includes image data (e.g., from an RGB camera), depth data (e.g., a depth image from a depth camera), ambient light sensor data (e.g., from an ambient light sensor), and/or motion data from one or more motion sensors (e.g., accelerometers, gyroscopes, IMU, etc.). In some implementations, the sensor data includes visual inertial odometry (VIO) data determined based on image data. The 3D point cloud may provide semantic information about one or more elements of the room. The 3D point cloud may provide information about the positions and appearance of surface portions within the physical environment. In some implementations, the 3D point cloud is obtained over time, e.g., during a scan of the room, and the 3D point cloud may be updated, and updated versions of the 3D point cloud obtained over time. For example, a 3D representation may be obtained (and analyzed/processed) as it is updated/adjusted over time (e.g., as the user scans a room).

In some implementations, sensor data may be positioning information, some implementations include a VIO to determine equivalent odometry information using sequential camera images (e.g., light intensity image data) and motion data (e.g., acquired from the IMU/motion sensor) to estimate the distance traveled. Alternatively, some implementations of the present disclosure may include a simultaneous localization and mapping (SLAM) system (e.g., position sensors). The SLAM system may include a multidimensional (e.g., 3D) laser scanning and range-measuring system that is GPS independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In some implementations, the device 400 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 400 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 400.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 includes a non-transitory computer readable storage medium.

In some implementations, the memory 420 or the non-transitory computer readable storage medium of the memory 420 stores an optional operating system 430 and one or more instruction set(s) 440. The operating system 430 includes procedures for handling various basic system services and for performing hardware dependent tasks. In some implementations, the instruction set(s) 440 include executable software defined by binary information stored in the form of electrical charge. In some implementations, the instruction set(s) 440 are software that is executable by the one or more processing units 402 to carry out one or more of the techniques described herein.

The instruction set(s) 440 includes a representation alignment instruction set 442, a positioning instruction set 444, and an overlay instruction set 448. The instruction set(s) 440 may be embodied as a single software executable or multiple software executables.

The representation alignment instruction set 442 is configured with instructions executable by a processor to obtain a pass-through video signal (depicting a physical environment) from an image sensor and align a 3D representation of a second environment with a 3D coordinate system of the physical environment.

The positioning instruction set 444 is configured with instructions executable by a processor to determining a viewpoint within the 3D coordinate system based on a position of the electronic device within the physical environment.

The overlay instruction set 446 is configured with instructions executable by a processor to present the pass-through video signal with an overlaid view of the 3D representation of the second environment based on the determined viewpoint.

Although the instruction set(s) 440 are shown as residing on a single device, it should be understood that in other implementations, any combination of the elements may be located in separate computing devices. Moreover, FIG. 4 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at an electronic device having a processor and one or more sensors:

aligning a 3D representation of a second environment with a 3D coordinate system of a physical environment;

determining a viewpoint within the 3D coordinate system based on a position of the electronic device within the physical environment; and presenting a view of the physical environment with an overlaid view of the 3D representation of the second environment based on the viewpoint, wherein the overlaid view of the 3D environment comprises visible lines corresponding to straight and curved edges of structural elements of the second environment, the visible lines defining transparent portions through which at least a portion of the view of the physical environment is visible.

2. The method of claim 1, further comprising:

obtaining a video signal from an image sensor of the one or more sensors, the video signal comprising video depicting the physical environment, wherein said presenting the view of the physical environment comprises presenting the video signal with the overlaid view of the 3D representation.

3. The method of claim 2, wherein:

the visible lines are presented with a higher contrast level than a contrast level of the video signal being presented; or the visible lines are presented with a higher brightness level than a brightness level of the video signal being presented.

4. The method of claim 1, wherein the overlaid view of the 3D environment comprises a surface contour line type representation.

5. The method of claim 1, wherein the overlaid view of the 3D environment comprises a first portion comprising a white surface contour line type representation and a second portion comprising a full virtual rendering of the 3D environment.

6. The method of claim 1, further comprising:

toggling a view of the physical environment with the overlaid view of the 3D representation between at least two views selected from: (a) a view comprising all of the view of the physical environment; (b) a view comprising all of the view of the physical environment in combination with the overlaid view of the 3D environment comprising a white surface contour line type representation; (c) a view comprising all of the view of the physical environment in combination with the overlaid view of the 3D environment a first portion comprising a white surface contour line type representation and a second portion comprising a full virtual rendering of the 3D environment; and (d) a view comprising a view consisting of a full virtual rendering of the 3D environment.

7. The method of claim 6, wherein said toggling comprises an automated toggling process initiated in response detection of user activity with respect to the physical environment.

8. The method of claim 1, wherein the electronic device is a head mounted device (HMD).

9. The method of claim 1, wherein said aligning comprises sizing the 3D representation based on a scale of the physical environment.

10. The method of claim 1, wherein the structural elements represent physical features of the second environment.

11. An electronic device comprising:

one or more sensors;

a non-transitory computer-readable storage medium; and one or more processors coupled to the non-transitory computer-readable storage medium, wherein the non-transitory computer-readable storage medium comprises program instructions that, when executed on the one or more processors, cause the electronic device to perform operations comprising:

aligning a 3D representation of a second environment with a 3D coordinate system of a physical environment;

determining a viewpoint within the 3D coordinate system based on a position of the electronic device within the physical environment; and presenting a view of the physical environment with an overlaid view of the 3D representation of the second environment based on the viewpoint, wherein the overlaid view of the 3D environment comprises visible lines corresponding to straight and curved edges of structural elements of the second environment, the visible lines defining transparent portions through which at least a portion of the view of the physical environment is visible.

12. The electronic device of claim 11, wherein the operations further comprise:

obtaining a video signal from an image sensor of the one or more sensors, the video signal comprising video depicting the physical environment, wherein said presenting the view of the physical environment comprises presenting the video signal with the overlaid view of the 3D representation.

13. The electronic device of claim 12, wherein:

the visible lines are presented with a higher contrast level than a contrast level of the video signal being presented; or the visible lines are presented with a higher brightness level than a brightness level of the video signal being presented.

14. The electronic device of claim 11, wherein the overlaid view of the 3D environment comprises a surface contour line type representation.

15. The electronic device of claim 11, wherein the overlaid view of the 3D environment comprises a first portion comprising a white surface contour line type representation and a second portion comprising a full virtual rendering of the 3D environment.

16. The electronic device of claim 11, wherein the operations further comprise:

toggling a view of the physical environment with the overlaid view of the 3D representation between at least two views selected from: (a) a view comprising all of the view of the physical environment; (b) a view comprising all of the view of the physical environment in combination with the overlaid view of the 3D environment comprising a white surface contour line type representation; (c) a view comprising all of the view of the physical environment in combination with the overlaid view of the 3D environment a first portion comprising a white surface contour line type representation and a second portion comprising a full virtual rendering of the 3D environment; and (d) a view comprising a view consisting of a full virtual rendering of the 3D environment.

17. The electronic device of claim 16, wherein said toggling comprises an automated toggling process initiated in response detection of user activity with respect to the physical environment.

18. The electronic device of claim 11, wherein the electronic device is a head mounted device (HMD).

19. A non-transitory computer-readable storage medium storing program instructions executable via one or more processors, of an electronic device having one or more sensors, to perform operations comprising:

aligning a 3D representation of a second environment with a 3D coordinate system of a physical environment;

determining a viewpoint within the 3D coordinate system based on a position of the electronic device within the physical environment; and presenting a view of the physical environment with an overlaid view of the 3D representation of the second environment based on the viewpoint, wherein the overlaid view of the 3D environment comprises visible lines corresponding to straight and curved edges of structural elements of the second environment, the visible lines defining transparent portions through which at least a portion of the view of the physical environment is visible.

20. The non-transitory computer-readable storage medium of claim 19, wherein the operations further comprise:

obtaining a video signal from an image sensor of the one or more sensors, the video signal comprising video depicting the physical environment, wherein said presenting the view of the physical environment comprises presenting the video signal with the overlaid view of the 3D representation.

21. The non-transitory computer-readable storage medium of claim 20, wherein:

the visible lines are presented with a higher contrast level than a contrast level of the video signal being presented; or the visible lines are presented with a higher brightness level than a brightness level of the video signal being presented.

22. The non-transitory computer-readable storage medium of claim 19, wherein the overlaid view of the 3D environment comprises a surface contour line type representation.

23. The non-transitory computer-readable storage medium of claim 19, wherein the overlaid view of the 3D environment comprises a first portion comprising a white surface contour line type representation and a second portion comprising a full virtual rendering of the 3D environment.

24. The non-transitory computer-readable storage medium of claim 19, wherein the operations further comprise:

toggling a view of the physical environment with the overlaid view of the 3D representation between at least two views selected from: (a) a view comprising all of the view of the physical environment; (b) a view comprising all of the view of the physical environment in combination with the overlaid view of the 3D environment comprising a white surface contour line type representation; (c) a view comprising all of the view of the physical environment in combination with the overlaid view of the 3D environment a first portion comprising a white surface contour line type representation and a second portion comprising a full virtual rendering of the 3D environment; and (d) a view comprising a view consisting of a full virtual rendering of the 3D environment.

* * * * *